Nov. 8, 1960 C. E. YOUNG 2,959,710
TUNING INDICATOR
Original Filed May 31, 1956
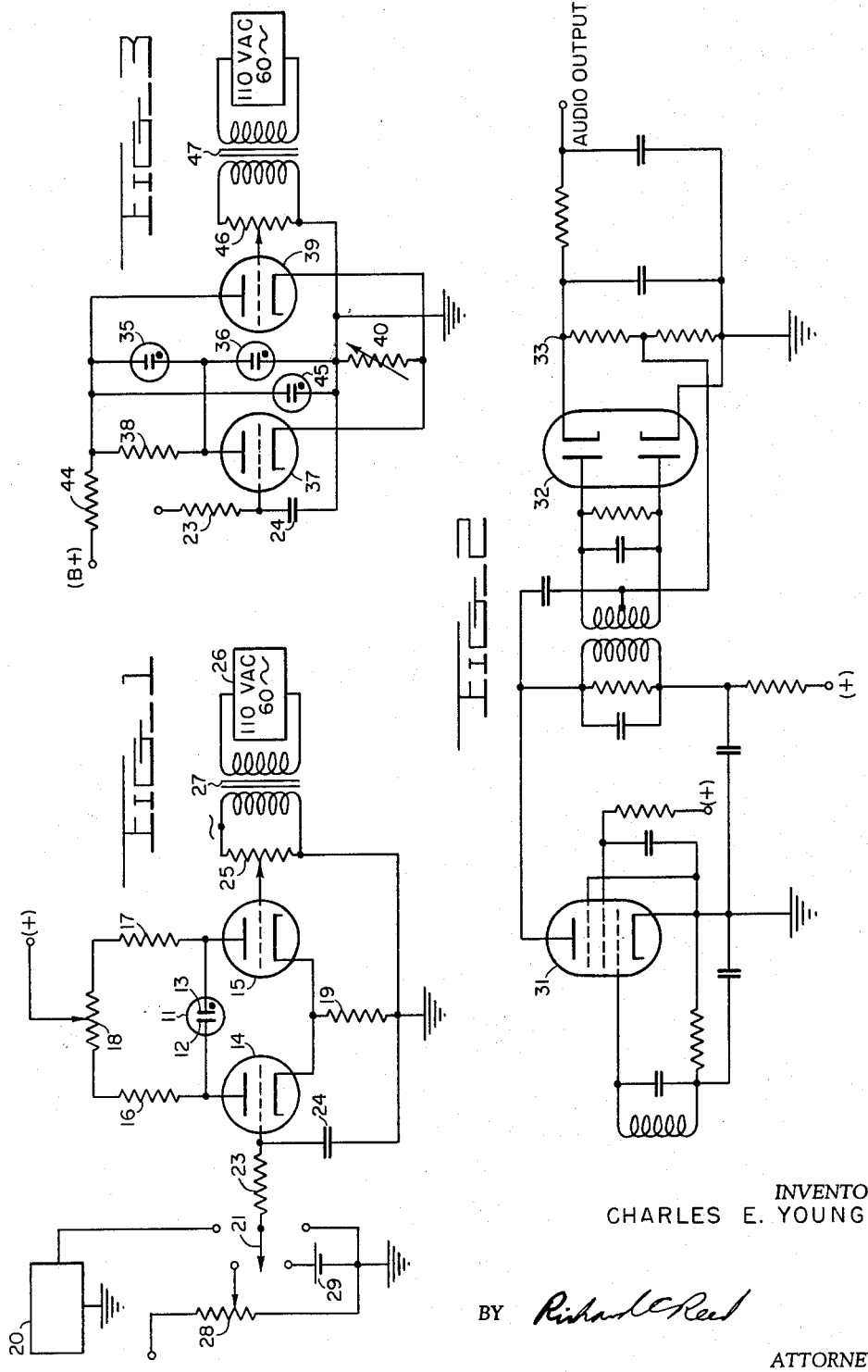
INVENTOR
CHARLES E. YOUNG
BY Richard C Reed
ATTORNEY

2,959,710

TUNING INDICATOR

Charles E. Young, 3112 Parkway Place, Cheverly, Md.

Original application May 31, 1956, Ser. No. 588,587. Divided and this application Oct. 30, 1959, Ser. No. 849,989

1 Claim. (Cl. 315—169)

(Granted under Title 35, U.S. Code (1952), sec. 266)

The invention described herein may be manufactured and used by or for the Government of the United States of America for governmental purposes without the payment of any royalties thereon or therefor.

This application is a division of application Serial No. 588,587, filed May 31, 1956 and relates in general to electrical measuring devices and in particular to a simplified device for indicating the existence of a selected voltage.

It is frequently desirable to have a rugged, compact, and inexpensive electrical measuring device capable of indicating the existence of a selected voltage and of deviations therefrom of the order of one volt or less. Sensitive milliammeters connected to operate as voltmeters are not infrequently used for such purposes because of inherent simplicity, however the disadvantages of such instruments are quite serious in that they are expensive, delicate, and require considerable space which must be located so as to be convenient for observation, usually on a front panel of associated equipment. With the present trend toward miniaturization and ruggedization, there are many instances where the use of milliammeter is extremely impractical. Other forms of devices of the character thus far described achieve ruggedization and compactness with neon-tube indicator devices to indicate signal level by the presence or absence of a glow. Conventional indicator tube devices leave much to be desired with respect to sensitivity, even with vacuum tube amplification, because of the rather large potentials required for ignition of the flow tube. Typically for neon tubes this potential is 90 volts. With such a voltage requirement, even with amplification of the order of 100, a practical limit for a single stage high-mu triode amplifier, a substantial input voltage change is required merely to overcome the inherent indicator characteristic limitation.

A typical example where the more conventional type of milliammeter is impractical and unnecessary is a tuning indicator in a frequency-modulation type of radio receiver. It is well known that the multiple response characteristic of a discriminator or other conventional types of detection systems employed in such receivers require considerable care in tuning, otherwise substantial distortion is likely to result. In such applications a scalar indication of the tuning is unnecessary, an entirely adequate result being obtainable from a device indicating, with reasonable sensitivity, any deviation from the correct tuning.

In accordance with the foregoing, an object of the present invention is to provide an electrical measuring device which is rugged, compact, and sensitive.

Another object of the present invention is to provide an electrical measuring apparatus employing a glow device to indicate the relationship of an electrical variable to a selected or reference level.

Another object of the present invention is to provide a voltage measuring device employing an ionizing gas indicator wherein high sensitivity is achieved without the necessity of a large amount of amplification of the signal voltage to be measured.

Another object of the present invention is to provide a tuning indicator for a radio receiver wherein tuning errors are indicated by variations in the ionization condition of a gas-filled electron tube.

Another object of the present invention is to provide a gas tube tuning indicator for a radio receiver wherein improved sensitivity is achieved by employing an auxiliary input signal of substantially uniform amplitude characteristics.

Other objects and many of the attendant advantages of this invention will be readily appreciated as the same becomes better understood by reference to the following detailed description when considered in connection with the accompanying drawings wherein:

Fig. 1 is a schematic diagram of a typical embodiment of the present invention.

Fig. 2 shows typical connections of the apparatus of Fig. 1 in a frequency modulation receiver circuit.

Fig. 3 shows a second embodiment of the present invention providing somewhat different indicator characteristics from those provided by the apparatus of Fig. 1.

The present invention provides an improved electrical measuring device of the type employing ionizing-gas indicator glow tubes wherein improved sensitivity is achieved through the application of a separate input signal to the indicator which approaches but does not exceed the ignition potential of the ionizing tube to thereby reduce the necessary amplitude variation of the signal being measured which is required to ionize and extinguish the tube. This signal is typically of an alternating current nature having a variational frequency sufficiently high as to avoid apparent flicker by utilizing the persistence of vision; however under certain conditions, it may be desirable to use lower variational frequencies to facilitate visual distinction of variations in glow intensity.

With particular reference now to Fig. 1 of the drawing, the schematic diagram illustrated therein employs as a basic indicator unit, a glow tube 11 such as a conventional neon tube type NE48, NE51 or the like. Such a tube typically has two electrodes 12 and 13 mounted within a glass envelope containing neon gas. Suitable provision is made for connecting the electrodes to external circuitry. In this instance the electrodes 12 and 13 of glow tube 11 are connected to the anodes of a pair of triode electron tubes 14 and 15 which are arranged in a form of push-pull circuits. In this circuit, the anodes of tubes 14 and 15 are also connected to a source of B(+) power through load resistances 16 and 17 and a balancing resistance 18. The cathodes of tubes 14 and 15 are connected to ground through resistance 19. Normally this ground will also be connected to the negative return of the B+ power source.

The grid of tube 14 is connected to an external circuit 20, the potential of which is to be measured, through switch 21 and a low pass filter network 23, 24 having a suitable time constant to permit transmission of only desired frequencies. Typically this external circuit 20 is also connected to ground.

The grid of tube 15 is connected to the adjustable tap of a potentiometer 25, having one terminal thereof connected to ground. Across potentiometer 25 is applied an alternating voltage. Typically this voltage is approximately 6 volts R.M.S. and is obtained from a 60 cycle power supply 26 through a transformer 27.

In the circuit of Fig. 1, glow tube 11 is characterized by the ability to conduct current in either direction with either electrode functioning as a glowing cathode, depending upon the polarity of the voltage applied thereacross. Thus electrode 12 will glow when the anode of tube 14 is sufficiently negative with respect to the anode of tube 15. Such a condition would be accompanied by heavier conduction in tube 14 than in tube 15.

Analysis of the circuit of Fig. 1 may be simplified by first considering that potentiometer 25 is adjusted to place the tap thereof at the ground end so that the A.C. signal from transformer 27 cannot reach the grid of tube 15. Additionally the potential of the grid of tube 14 should be considered as being at substantially ground potential typically the result of the appropriate setting of switch 21. Under such input conditions the balancing resistance 18 is adjusted to place approximately equal potentials at the anodes of tubes 14 and 15. The result as far as glow tube 11 is concerned is the application of zero potential thereacross and the absence of conduction thereby so that the tube does not glow. Any subsequent change in the potential of the grid of tube 14 will change the conductivity of tube 14, causing a change in the anode potential thereof and an opposite polarity change at the common cathode connection of tubes 14 and 15. Tube 15 will thus experience a conductivity change of opposite sense to that of tube 14. When the unbalance reaches such proportions as to exceed the ignition potential of glow tube 11, the tube will ignite, with one electrode thereof glowing. Thus the tube will indicate three conditions, balance, unbalance in one direction, and unbalance in the other direction.

The foregoing operation leaves much to be desired however, because a significant unbalance in input voltage is required merely to exceed the ignition potential of the tube, and once the glow tube is ignited, a significant reduction in the unbalance is required to bring about extinction of the glow. To this end it is desirable to use high-mu triodes for the tubes 14, 15. Even with such tubes providing a typical amplification of 100, it is apparent that a variation of nearly 1 volt from the selected reference potential is required to cause ignition of glow tube 11.

The present invention provides significant reduction in the amount of input voltage variation which is required to produce indication on the glow tube by including circuitry for applying an additional signal of an "alternating-current" nature to the tubes 14 and 15 which provides a large part of the voltage variation signal required for igniting the glow in glow tube 11. Under such condition only a relatively small unbalance is required in the circuit being measured to produce a usable indication. This additional signal is supplied to the grid of tube 15 and may be controlled in amplitude by adjustment of potentiometer 25. The selection of the proper amplitude of this signal is of considerable importance because this signal alone must not cause ignition of the glow tube 11. Thus with the desired reference potential applied to the grid of tube 14, potentiometer 25 is adjusted first to apply sufficient signal to the grid of tube 15 to produce ignition of glow tube 11, then turned down slightly to where ignition of glow tube 11 ceases. In this condition the measuring circuit is extremely sensitive to small variations in the potential of grid 14 although it is obvious that this sensitivity can be reduced by further reductions in the amplitude of the signal applied to the grid of tube 15.

With the high sensitivity thus available, careful adjustment of the balancing resistance 18 is desired. This is perhaps best accomplished prior to the final sensitivity adjustment of potentiometer 25 but with the desired potential applied to the grid of tube 14. Potentiometer 25 is moved slowly back and forth across the limiting threshold between ignition and non-ignition of glow tube 11, and balancing resistance 18 is adjusted to where ignition of both electrodes of glow tube 11 appears to occur simultaneously. With a balanced condition thus established, final adjustment of potentiometer 25 is made as previously described to achieve the desired sensitivity.

From the foregoing it is apparent that the circuit typified in Fig. 1 is particularly adapted to indicate variations of the grid potential of tube 14 above and below a reference potential which is substantially equal to ground potential. Where it is desired to measure other potentials, readjustment of balancing resistance 18 will permit operation at slightly different reference potentials of the order of several volts. For use as a general purpose voltmeter considerable change in the external potential may be accommodated by utilization of a suitable voltage divider such as that of potentiometer 28 having a scale co-operative with the variable top thereof and calibrated in volts, as for example, by calculation or with the prior experimental application of known potentials thereacross. To this end switch 21 is provided with a terminal thereof connected to the top of potentiometer 28.

Furthermore with regard to connections of switch 21, a battery 29 may be incorporated to provide a relatively stable source of unbalance voltage which frequently is of considerable convenience in calibration.

A typical application of the apparatus of Fig. 1 is that of a tuning indicator for a frequency modulation receiver, connections to which are typified by Fig. 2. This circuit includes a conventional limiter stage employing tube 31 followed by a discriminator employing tube 32. The potential of point 33 is dependent upon the frequency of the signal applied to tube 31, and for exact tuning, varies at an audio frequency rate across a center potential of zero volts relative to ground. Under conditions of improper tuning the center potential will not be zero, but will be either positive or negative relative to ground. Thus the circuit of Fig. 1 would be connected to point 33 of Fig. 2, connection being made to point 34 of Fig. 1. Glow tube 11, which is of a half inch diameter, or even less, is preferably mounted on the front panel of the FM receiver, near the tuning control mechanism thereof to facilitate viewing and adjustment of the receiver to the desired condition of exact tuning.

Fig. 3 is an alternate embodiment of the present invention which has characteristics which may be desirable in certain situations. In this circuit, two glow tubes 35 and 36 are employed to indicate the relationship of an input signal to a preselected reference. This input signal is applied to the grid of tube 37 however the input signal source 20, potentiometer 28, battery 29 and switch 21 as shown in Fig. 1 would normally be incorporated for general purpose voltmeter service. The anode of tube 37 is connected to a B+ power supply through resistance 38 while the cathode of tube 37 is connected to the cathode of tube 39 and through variable resistance 40 to ground which is normally the negative return of the B+ power supply. Resistance 44 and a voltage regulator tube 45 are incorporated into the B+ supply lead for stability. Glow tube 35 is connected across resistance 38 while glow tube 36 is connected between the anode of tube 37 and ground. The anode of tube 39 is connected to the juncture of resistances 44 and 38 whereas the grid of that tube is connected to a source of alternating voltage through potentiometer 46 and transformer 47.

The circuit of Fig. 3 operates substantially the same as the previously described circuit of Fig. 1, with the primary difference that either glow tube 35 or glow tube 36 will glow to indicate the sense of variation of the input voltage from the selected reference. Only one electrode of each tube 35—36 will glow however, rather than a shift of glow from one electrode to the other as in the single tube circuit of Fig. 1.

Adjustment of the circuit of Fig. 3 is generally the same as that previously described for Fig. 1, with variable resistance 40 in this case providing the balance between the two glow tubes 35 and 36 and potentiometer 46 providing the sensitivity adjustment.

The circuit of Fig. 3 is typically connected in a circuit such as that of Fig. 2 in the same manner as the circuit of Fig. 1.

Obviously, many modifications and variations of the present invention are possible in the light of the above teachings. It is therefore to be understood that within the scope of the appended claim, the invention may be practiced otherwise than as specifically described.

What is claimed is:

An indicator device comprising first and second gas tube indicators, each having at least two mutually operative electrodes, first and second high vacuum electron tubes each having at least anode, cathode and control grid electrodes, a main discharge energization source for the high vacuum electron tubes, an anode load resistance for the first electron tube, means connecting the first gas tube indicator across the anode load resistance, means connecting the second gas tube indicator across the plate resistance of the first electron tube, a common cathode load for both electron tubes, means for driving the control grid of one of said electron tubes with an alternating signal of a magnitude insufficient to produce glow discharge in at least one gas tube indicator, and means for driving the control grid of the second electron tube with an additional signal independent of the alternating signal and of sufficient amplitude to produce a glow discharge in at least one gas tube indicator.

References Cited in the file of this patent

UNITED STATES PATENTS

| | | |
|---|---|---|
| 2,503,958 | Lyons | Apr. 11, 1950 |
| 2,934,677 | Faulkner | Apr. 26, 1960 |